United States Patent [19]
van Rumpt et al.

[11] Patent Number: 5,513,262
[45] Date of Patent: Apr. 30, 1996

[54] DEVICE FOR ENCIPHERING AND DECIPHERING, BY MEANS OF THE DES ALGORITHM, DATA TO BE WRITTEN TO BE READ FROM A HARD DISK

[75] Inventors: Harm W. van Rumpt, 's-Hertogenbosch; Jan van Maanen, Renkum; Nicolaas J. M. Opdam, Malden; Willem J. Vervoorn, Hellouw, all of Netherlands

[73] Assignee: Tulip Computers International B.V, 's-Hertogenbosch, Netherlands

[21] Appl. No.: 19,068

[22] Filed: Feb. 18, 1993

[30] Foreign Application Priority Data

Feb. 18, 1992 [NL] Netherlands ............... 9200296

[51] Int. Cl.$^6$ .................................................. H04L 9/00
[52] U.S. Cl. .................. 380/29; 380/4; 380/49; 380/28; 380/50
[58] Field of Search .................. 395/425, 427; 380/4, 25, 28, 29, 49, 50, 3

[56] References Cited

U.S. PATENT DOCUMENTS

| | | | |
|---|---|---|---|
| 4,780,905 | 10/1988 | Cruts et al. | 380/44 |
| 5,008,935 | 4/1991 | Roberts | 380/29 |
| 5,113,369 | 5/1992 | Kinoshita | 395/325 |
| 5,283,828 | 2/1994 | Saunders et al. | 380/4 |
| 5,349,642 | 9/1994 | Kingdon | 380/25 |

FOREIGN PATENT DOCUMENTS 62-026561  2/1987  Japan.

OTHER PUBLICATIONS

Hindin, Harvey J., "LSI-based data encryption discourages the data thief", *Electronics*, vol. 52, No. 13 (1979–06), pp. 107–120.

*Primary Examiner*—Mark R. Powell
*Assistant Examiner*—Kee M. Tung
*Attorney, Agent, or Firm*—Peter L. Michaelson

[57] ABSTRACT

A device for enciphering and deciphering with the aid of the DES algorithm data to be written to or read from a hard disk, wherein the input of a DES cipher device (25) is coupled, via a converter (26) for converting data words having a word width of 16 bits to data words having a word width of 64 bits, to a bus for transferring data words having a word width of 16 bits to and from a central processor unit, and to a bus for transferring data words having a word width of 16 bits to and from a disk storage unit and wherein the output of the DES cipher device is coupled, via a multiplexer (27) for converting data words having a word width of 64 bits to data words having a word width of 16 bits, to the bus of the central processor unit and to the bus of the disk storage unit.

15 Claims, 2 Drawing Sheets

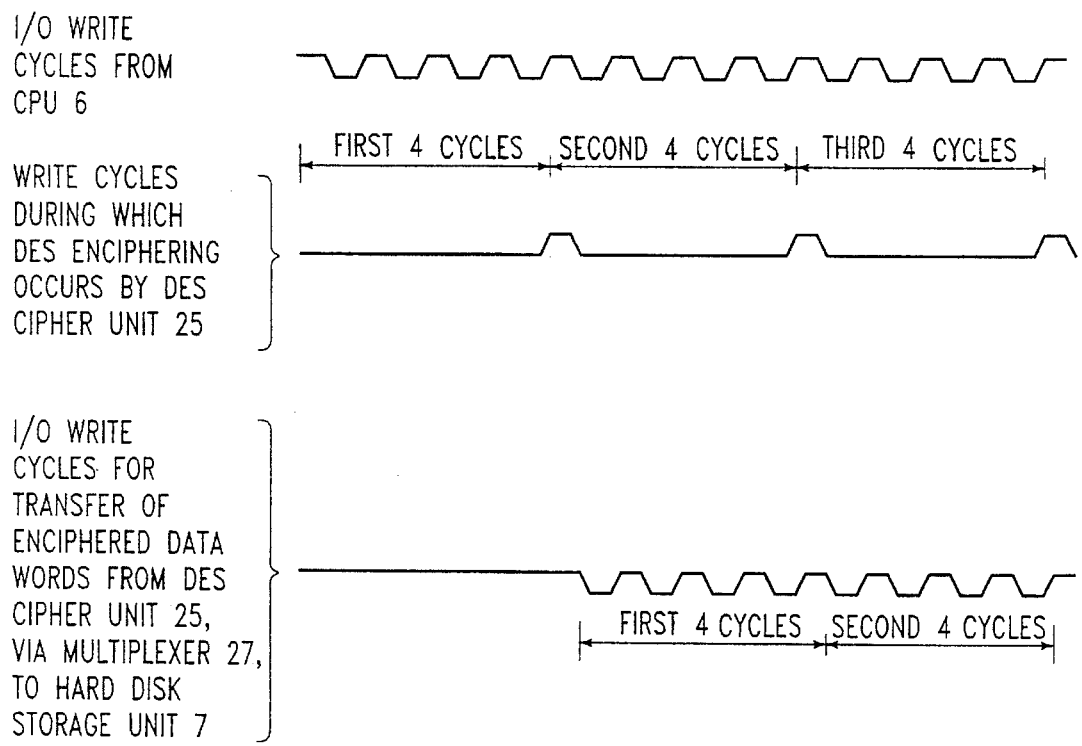
FIG. 3a — HARD DISK WRITE OPERATION
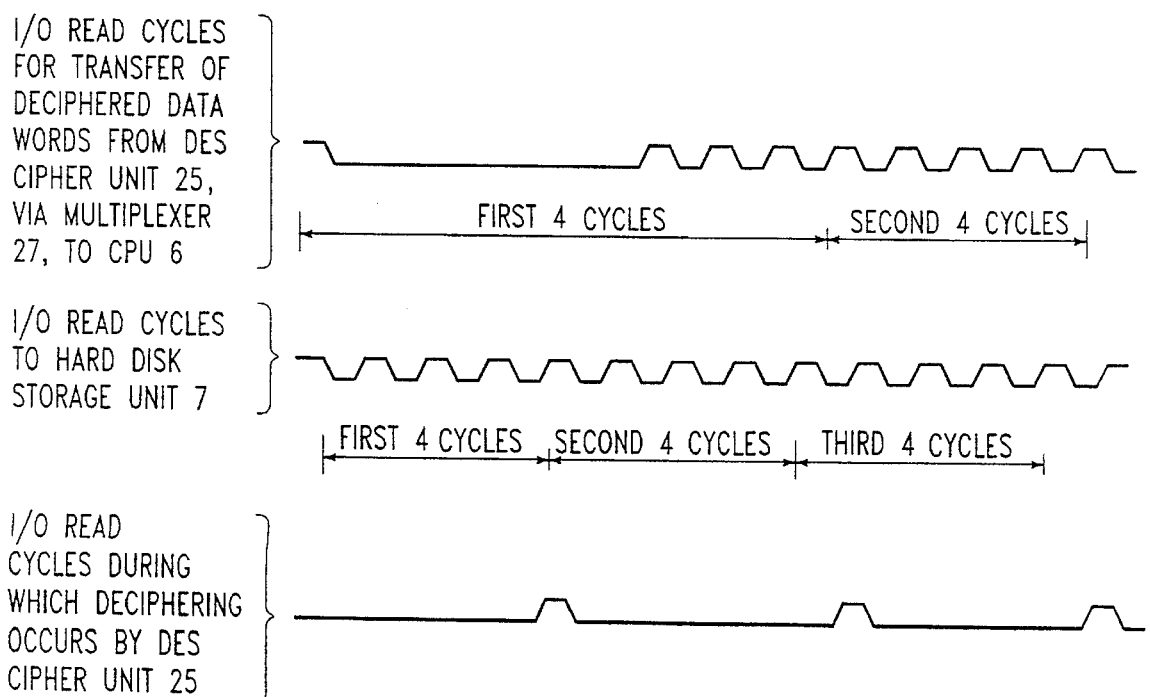
FIG. 3b — HARD DISK READ OPERATION

DEVICE FOR ENCIPHERING AND DECIPHERING, BY MEANS OF THE DES ALGORITHM, DATA TO BE WRITTEN TO BE READ FROM A HARD DISK

BACKGROUND OF THE INVENTION

The present invention relates to a device for enciphering and deciphering data to be written to or read from a hard disk.

The object of the invention is to provide a device by which, in an efficient manner and without expensive hardware and/or complex software, use can be made of existing hard disk storage units, for instance of the IDE type (IDE= Integrated Drive Electronics), and standardized computer types, for instance computers of the so-called AT type in cooperation with commercially available cipher ICs for encryption through the Data Encryption Standard (DES) algorithm.

A problem in the use of commercially available cipher ICs for encryption through the DES algorithm is that these ICs encrypt words of a width of 64 bits, whereas many computer standards function with words of a considerably lesser width, for instance a word width of 16 bits in the case of an AT computer. A drawback of previously proposed combinations of existing computer systems with commercially available cipher ICs is that the processing of data during writing to or reading from a hard disk storage unit is very slow and that additional software is required for controlling the cipher IC and the disk storage unit.

SUMMARY OF THE INVENTION

Accordingly, the object of the present invention is to provide a system that is capable of processing the data to be enciphered or deciphered in a considerably simpler manner and clearly faster than was possible with the solutions known heretofore.

To that end, a device of the above-mentioned type is characterized, according to the invention, in that incoming n-bit wide words (with n being an integer less than or equal to 64) which are to be applied as input to a 64-bit DES ciphering device, are first converted, via a converter, into 64-bit words which, in turn, are then applied to an input of the ciphering device. Resulting 64-bit words (either ciphered or deciphered) are then converted back into n-bit words for application, via a respective n-bit bus, to a central processing unit (CPU) or to a disk storage unit. The incoming n-bit words are either read from the disk storage unit and are to deciphered prior to being applied to the CPU, or result from the CPU and are to be ciphered for subsequent storage on the disk storage unit.

BRIEF DESCRIPTION OF THE DRAWINGS

The advantages of the device according to the invention will be further explained on the basis of an exemplary embodiment with reference to the accompanying drawings, in which:

FIGS. 3a and 3b are timing diagram of a number of I/O cycles during data writing to and data reading from a hard disk storage unit respectively.

DETAILED DESCRIPTION

Figure 1:
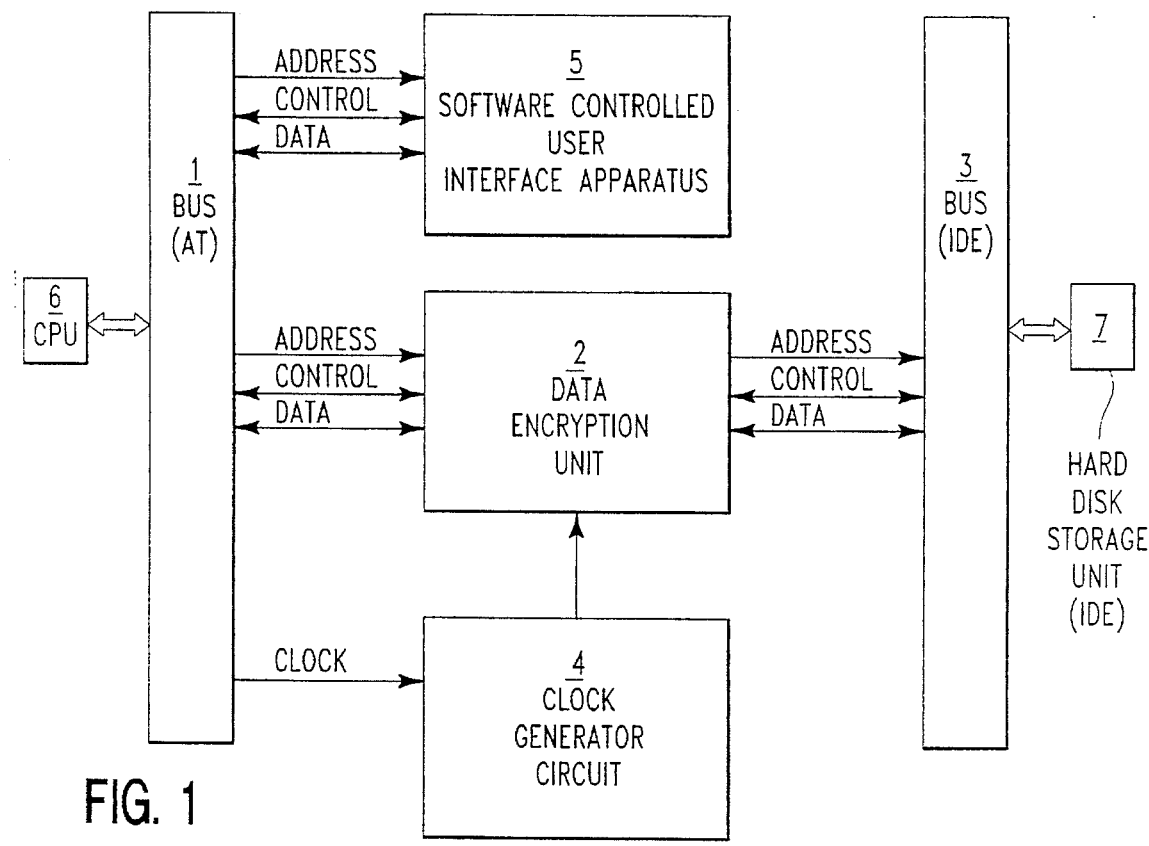
FIG. 1 is a block diagram indicating the arrangement of the device according to the invention between a bus of a computer and a bus of a hard disk storage unit.

In FIG. 1, reference numeral 1 indicates a bus, for instance an AT bus, along which data in a computer of the AT type with a word width of 16 bits are transmitted. However, the device according to the invention can also function advantageously when the data words have a different word width of n bits, as long as n is an integer less than or equal to 64 . Bus 1 is connected to a central data processing unit (CPU) 6 and is connected, via a data bus, an address bus, and a control bus, to a data encryption unit 2, which in turn is connected via identical buses to the bus 3 of the hard disk storage unit 7 of the IDE type (Integrated Drive Electronics), which is also intended to transfer data having a word width of 16 bits. FIG. 1 further shows a clock generator circuit 4, which provides the clock signals for unit 2 and which, via a clock signal bus, is controlled from the AT bus. Finally, FIG. 1 shows a software controlled user interface apparatus 5 to enable interaction with a user, this interface apparatus being connected to the AT bus 1 via a data bus, an address bus and a bus for control signals. As such, the clock generator circuit and the software controlled user interface apparatus are well-known constituents for use in a personal computer and will therefore not be discussed hereinafter.

Figure 2:
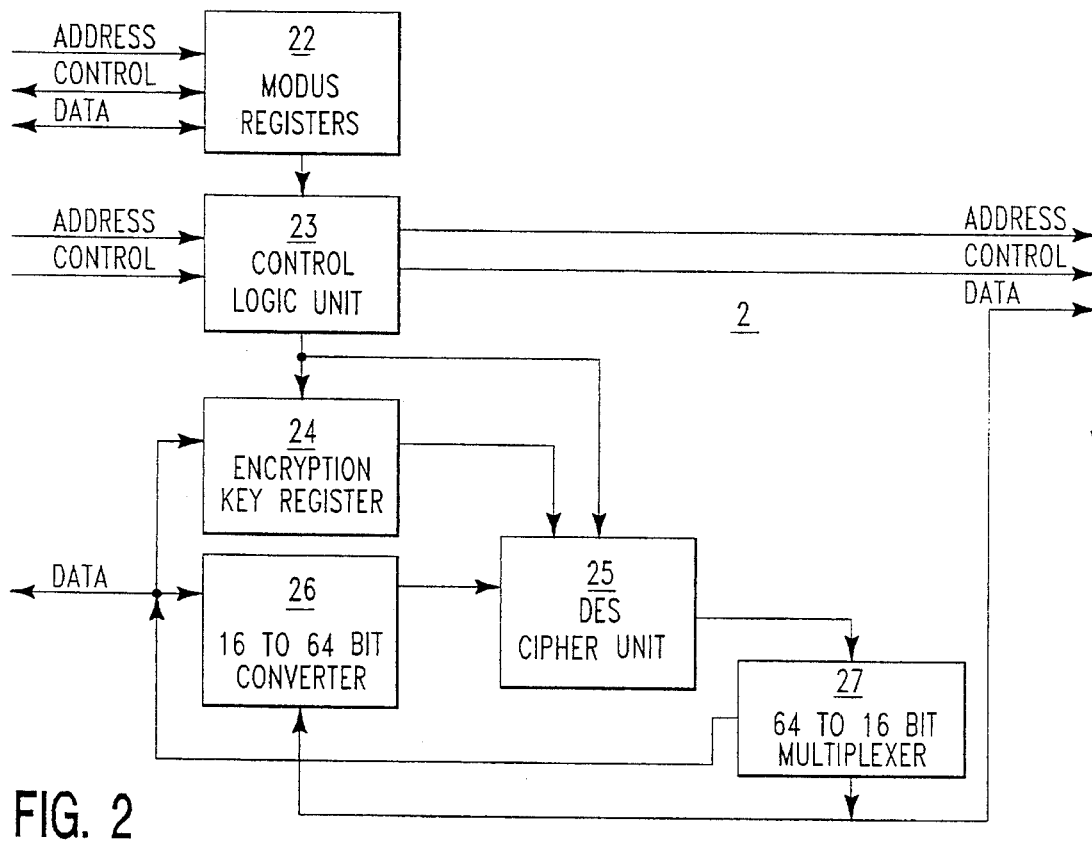
FIG. 2 is a block diagram of the device according to the invention.

FIG. 2 shows in more detail the construction of the data encryption unit 2 according to the invention. To facilitate understanding, the reader should simultaneously refer to both FIGS. 1 and 2 throughout the following discussion. It comprises modus registers 22, a control logic unit 23, an encryption key register 24 and a cipher unit 25.

The modus registers 22 afford the possibility of choosing between one or more different operating modes of the device according to the invention. These modes may for instance include:

a 16-bit hard disk mode;

a 16-bit write/read I/O mode;

a block cipher mode;

a cipher feedback mode.

The control logic unit 23 provides the generation of the control signals for internal use in the unit 2 and the addresses and control signals for the IDE hard disk storage unit.

The key register 24 provides the 56-bit key which is utilized in the DES cipher unit 25 for enciphering data.

The cipher unit 25 is of a current commercially available type, for instance one of the types supplied by the firm of Western Digital. Since the actual operation of the DES cipher algorithm is not important for a proper understanding of the present invention, except that it is necessary to know that encryption occurs word for word using the, 56-bit encryption key and that the words have a width of 64 bits, the operation of this algorithm will not be further explained. Moreover, the operation of the algorithm is known from different publications. As is also known, the DES algorithm is capable of enciphering the data to be encrypted according to a block cipher mode or a cipher feedback mode. The availability of these two modes is not important for a proper understanding of the present invention either, and the actual significance thereof for encryption, which, for that matter, is also known from the literature, will not be further discussed. For a detailed exposition of the possible applications of encryption according to the DES algorithm in communication systems and computers, reference is made to the article "LSI-based data encryption discourages the data thief" by H.J. Hindin in Electronics, Jun. 21, 1979, pp. 107–120.

A disk storage unit of the IDE type is a sector-oriented storage medium having a storage capacity of 512 bytes per sector. A total storage capacity of one million sectors or more per IDE disk storage unit is possible. An IDE disk storage unit possesses 18 task registers for input/output (I/O) operations. For a more detailed discussion of these registers and their specific functions, reference may be made to the article "The IDE Hard Disk Interface" by R.C. Alford in BYTE, Mar. 1991, pp. 317–323.

Relevant to the present invention is only the data register of an IDE disk storage unit, to be addressed under the address 1OF, this register giving access to the hard disk storage unit for read and write operations in the programmed I/O mode. This register provides a path of 16-bit width to the sector storage for normal read and write operations.

In the device according to the invention, all data to and from the data register are enciphered and deciphered, with the exception of the commands "Format" and "Identify Drive", which commands are recognized by the device 2 in a manner that is of no further relevance, and, through inactivation of the DES cipher unit 25 during the transmission of these two commands, are transferred direct to the IDE bus 3.

To realize the objective of the present invention, i.e., to obtain encryption of data to be transferred to and from a hard disk storage unit without additional software, the device 2 comprises a 16- to 64-bit converter 26 and a 64- to 16-bit multiplexer 27.

The purpose of converter 26 is to convert, in the encryption mode of unit 2, the 16-bit data words coming from the AT bus 1 to 64-bit data words, which are applied to the input of the DES circuit 25 so as to be enciphered, as well as to convert, in the decryption mode of unit 2, the 16-bit data words coming from the IDE bus to 64-bit data words, which are likewise applied to the input of the DES circuit 25 so as to be deciphered.

The purpose of the multiplexer 27 is to convert the 64-bit data words generated by the DES circuit 25 to 16-bit data words, which, in the encryption mode, i.e., during data writing to the IDE disk storage unit, are applied to the IDE bus 3, and which, in the decryption mode, i.e., during data reading from the IDE disk storage unit, are applied to the AT bus 1.

The converter 26 and the multiplexer 27 are controlled by means of clock signals, in such a manner that a user will not notice that a cipher unit has been included between the central processor of his computer and the IDE disk storage unit. The user will not even notice this by the speed at which the data are processed, because no noticeable delay is introduced by the cipher device according to the present invention.

FIG. 3a shows how 16-bit data words are enciphered during an I/O write operation.

The central processor (CPU) 6, connected to the AT bus 1, continuously generates I/O write cycles, during four of which the data generated by the CPU are buffered in the converter 26 and converted to a 64-bit data word. After every fourth I/O write cycle, the 64-bit data word is applied to the DES cipher unit 25 by the converter 26 and enciphered by the cipher unit 25 during the fifth I/O cycle, i.e., the first I/O cycle of the next group of four I/O cycles, while, simultaneously, at the input of the converter 26 already a next 16-bit data word is read. After the fifth I/O cycle, the enciphered 64-bit data word is buffered and during the next four I/O cycles, the multiplexer 27 forms four 16-bit data words from the enciphered data word, these 16-bit data words being successively transferred via the IDE bus 3 to the IDE disk storage unit. In FIG. 3a, the upper line indicates the successive I/O cycles, the middle line indicates the cycles during which the data are enciphered and the lower line indicates the cycles during which the data are transferred via the multiplexer as enciphered 16-bit data words to the hard disk storage unit. As appears clearly from FIG. 3a in particular, after an initial delay of four I/O cycles, there is no further delay as a result of encryption. For the user, therefore, the device is entirely transparent and it is as if the data is written direct to an IDE disk storage unit.

FIG. 3b, analogous to FIG. 3a, shows the readout of enciphered 16-bit data words from the hard disk, their decryption as 64-bit data words and their transfer as 16-bit data words to the CPU. As the upper line of FIG. 3b shows, the first I/O read cycle of the CPU is delayed by four I/O periods, while, simultaneously, as indicated by the middle line, emulated I/O cycles to the IDE disk storage unit are started in order to read 16-bit enciphered data words therefrom, these enciphered 16-bit data words being successively applied to the converter 26, where they are assembled into a 64-bit enciphered data word. This enciphered 64-bit data word is applied to the cipher unit 25 after every fourth cycle and, in deciphered form, as a 64-bit data word, applied to the multiplexer 27 which buffers the data word and in the next four I/O cycles successively transfers four 16-bit data words to the CPU, as shown at the upper line in FIG. 3b. During the fifth I/O cycle, already the next 16-bit data word is read from the IDE disk storage unit and transferred to the converter 26, so that after the first delay of four I/O cycles, the system functions, so to speak, as a pipeline and introduces no further delay. Accordingly, during readout of enciphered data, after the initial delay of four I/O cycles, the cipher interface according to the invention is entirely transparant to a user and there is no need for additional software drivers and the like, while the interface according to the invention can cooperate without any problems with all known operating systems.

We claim:

1. Apparatus for enciphering and deciphering data to be written to and read from a hard disk, the apparatus comprising:

a processor;

a hard disk storage unit; and an encryption/decryption circuit connected between the processor and the hard disk storage unit for enciphering and 8 deciphering data through a data encryption standard (DES) algorithm, the encryption/decryption circuit having:

a first converter circuit for converting n-bit wide words applied as an input thereto (wherein n is an integer less than or equal to 64) into 64-bit wide words, said n-bit words incoming, via a first n-bit wide bus, from the processor and intended for storage in the hard disk storage unit or incoming, via a second n-bit wide bus, from the hard disk storage unit and intended for application to the processor;

a DES cipher circuit, connected to and responsive to the converter and through use of the DES algorithm, for enciphering each of the 64-bit words, formed of n-bit words incoming from the processor, into corresponding 64-bit DES encrypted words and for deciphering each of the 64-bit words, formed of n-bit words incoming from the hard disk storage unit, into corresponding 64-bit DES decrypted words; and a second converter circuit, connected to the DES cipher circuit, for converting each of the 64-bit DES encrypted words into n-bit encrypted words and for applying, via the second n-bit bus, each of the n-bit encrypted words to said hard disk storage unit for storage thereon, and for converting each of the 64-bit DES decrypted words into n-bit decrypted words and for applying, via the first n-bit bus, each of the n-bit decrypted words to the processor.

2. The apparatus in claim 1 wherein the encryption/decryption circuit further comprises control logic for recognizing pre-defined hard disk command words and data associated therewith present in the incoming n-bit words from the processor and, in response thereto, for controlling said DES cipher circuit so as to transfer therethrough, without DES enciphering, said command words and the data associated therewith such that the command words and the accompanying data pass, without being DES enciphered, between the hard disk storage unit and the processor.

3. The apparatus in claim 1 wherein n equals a value of 16.

4. The apparatus in claim 3 wherein the encryption/decryption circuit further comprises control logic for recognizing pre-defined hard disk command words and data associated therewith present in the incoming n-bit words from the processor and, in response thereto, for controlling said DES cipher circuit so as to transfer therethrough, without DES enciphering, said command words and the data associated therewith such that the command words and the accompanying data pass, without being DES enciphered, between the hard disk storage unit and the processor.

5. The apparatus in claim 4 wherein the first and second busses are the same.

6. The apparatus in claim 1 wherein the encryption/decryption circuit further comprises control logic for controlling DES ciphering of the 64-bit words in response to an input/output (I/O) write cycle signal and DES deciphering of the 64-bit words in response to an I/O read cycle signal, said read and write cycle signals being provided by the processor.

7. The apparatus in claim 6 wherein n equals a value of 16.

8. The apparatus in claim 7 wherein the control logic controls said first converter circuit, in response to four successive ones of nine successive write cycles on said I/O write cycle signal, to convert four successively occurring ones of 16-bit words appearing on the first bus into one of the 64-bit wide words, controls the DES cipher circuit, in response to a fifth one of the nine write cycles, to DES encipher the one 64-bit wide word into a corresponding one of the 64-bit DES encrypted words, and controls the second converter circuit, in response to four remaining successive ones of the nine write cycles, to convert the corresponding one 64-bit DES encrypted word into four successively occurring 16-bit encrypted words and to apply each of the four encrypted 16-bit words to the second bus for application to the hard disk storage unit.

9. The apparatus in claim 8 wherein the logic circuit operates the first and second converter circuits, in response to the write cycles, concurrently but on a time staggered basis with a pre-defined temporal offset therebetween such that the encryption/decryption circuit functions on a pipelined basis.

10. The apparatus in claim 9 wherein the pre-defined temporal offset is a period defined by four successive ones of the write cycles.

11. The apparatus in claim 10 wherein the control logic recognizes pre-defined hard disk command words and data associated therewith present in the incoming n-bit words from the processor and, in response thereto, controls said DES cipher circuit so as to transfer therethrough, without DES enciphering, said command words and the data associated therewith such that the command words and the accompanying data pass, without being DES enciphered, between the hard disk storage unit and the processor.

12. The apparatus in claim 7 wherein the control logic controls said first converter circuit, in response to four successive ones of nine successive read cycles on said I/O read cycle signal, to convert four successively occurring ones of encrypted 16-bit words appearing on the second bus into one of the 64-bit wide words, controls the DES cipher circuit, in response to a fifth one of the nine read cycles, to DES decipher the one 64-bit wide word into a corresponding one of the 64-bit DES decrypted words, and controls the second converter circuit, in response to four remaining successive ones of the nine read cycles, to convert the corresponding one 64-bit DES decrypted word into four successively occurring 16-bit decrypted words and to apply each of the four decrypted 16-bit words to the first bus for application to the processor.

13. The apparatus in claim 12 wherein the logic circuit operates the first and second converter circuits, in response to the write cycles, concurrently but on a time staggered basis with a pre-defined temporal offset therebetween such that the encryption/decryption circuit functions on a pipelined basis.

14. The apparatus in claim 13 wherein the pre-defined temporal offset is a period defined by four successive ones of the write cycles.

15. The apparatus in claim 14 wherein the control logic recognizes pre-defined hard disk command words and data associated therewith present in the incoming n-bit words from the processor and, in response thereto, controls said DES cipher circuit so as to transfer therethrough, without DES enciphering, said command words and the data associated therewith such that the command words and the accompanying data pass, without being DES enciphered, between the hard disk storage unit and the processor.

* * * * *